United States Patent [19]
Evans

[11] Patent Number: 5,418,851
[45] Date of Patent: May 23, 1995

[54] SHOCK PREVENTING TELEPHONE HANDSET FOR PAYSTATION

[75] Inventor: Paul M. Evans, Union Grove, Ala.

[73] Assignee: Quadrum Telecommunications, Inc., Huntsville, Ala.

[21] Appl. No.: 220,613

[22] Filed: Mar. 31, 1994

[51] Int. Cl.⁶ ............................................. H04M 1/00
[52] U.S. Cl. ..................................... 379/433; 379/437
[58] Field of Search ............... 379/433, 437, 438, 428, 379/434, 451

[56] References Cited

U.S. PATENT DOCUMENTS

| | | | |
|---|---|---|---|
| 4,796,288 | 1/1989 | Busch et al. | 379/433 |
| 4,984,268 | 1/1991 | Brown et al. | 379/433 |

*Primary Examiner*—James L. Dwyer
*Assistant Examiner*—Jack Chiang
*Attorney, Agent, or Firm*—Robert J. Black

[57] ABSTRACT

Shock prevention elements for use in a telephone paystation handset consisting of a pair of polyester dielectric elements positioned over associated transmitter and receiver units so as to block high voltage potentials resulting from application of collect and refund signals applied to the paystation from an associated telephone central office.

5 Claims, 1 Drawing Sheet

SHOCK PREVENTING TELEPHONE HANDSET FOR PAYSTATION

BACKGROUND OF THE INVENTION

1. Field of the Invention

The present invention relates to telephone paystations, or coin telephones, and more particularly to a shock preventing handset for use with a telephone paystation.

2. Background Art

A number of techniques have been employed in the past to prevent the transmission of an electrical shock from a telephone paystation to the user. Usually very expensive, these techniques have included the use of waterproof handsets, as well as handsets which electrically isolate the transmitter and/or receiver via a transformer. It has also been in the case of paystations to utilize relays to isolate the handset during the application from the telephone central office of high voltage collect or refund potentials. Handsets have also been isolated by utilizing capacitors to isolate the transmitter and/or receiver.

A background art search directed to the subject matter of this application and conducted in the U.S. Patent and Trademark Office disclosed the following U.S. Letters Patent:

| | |
|---|---|
| 4,672,666 | 4,974,258 |
| 4,821,320 | 5,081,674 |
| 4,845,760 | 5,237,608 |
| British Patent 425,186 | |

None of the patents discovered in the search disclosed means for preventing the transmission of high voltage electrical shock resulting from the application of collect or refund potential at the central office to the user. Of the discovered patents, two related to the protecting of internal equipment from electrostatic discharge as well as providing some protection to the user from the same electrostatic charge. These patents included U.S. Pat. No. 4,821,320 which issued to Andert et al on Apr. 11, 1989. This patent is drawn to a device for protecting both operator of the telephone and the electronic equipments included in their from high electrostatic discharge. Protection is achieved by providing a contact path which has substantial ohmic resistance and which terminates in the apparatus at a ground point carrying a low potential.

U.S. Pat. No. 5,237,608 was granted to Otto et al on Aug. 27, 1993. This patent also pertains to a system that prevents the risk of arc over due to electrostatic discharge in the region of the joining location of the bottom tub and upper housing portion of the telephone, thus protecting electrical components contained within the telephone handset. Protection is provided by connecting the upper housing part to the bottom part with edge region adapted to the outside contour of the bottom tub. Thus the edge region overlaps the bottom tub over a large area.

SUMMARY OF THE INVENTION

Many telephone paystations include handsets that have a potential for providing electric shock to the user from both the transmitter and receiver included within the handset. This potential typically can be produced on all four handset electrical leads in response to the application of collect or refund signals applied from the telephone central office over the L2 or tip lead to earth ground. This potential is typically in the nature of 130 volts DC. The potential can also exist on those leads from the inductive kick from the operation of the coin relay in the telephone paystation which can generate in excess of 500 volts DC on the transmitter and receiver located within the handset. The possibility for the existence of such high potentials on all four leads within the telephone handset consist because both the transmitter and receiver usually have a lead connected in common to the line interface circuit board included within the telephone paystation.

To prevent a shock from reaching the user of a telephone paystation, elements consisting of a thin sheet of polyester (Mylar) are placed between two rubber washers and put in both the transmitter and receiver cups. These elements are positioned in front of the transmitter and receiver, respectively. Inasmuch as polyester has a very high dielectric strength, these elements then block any shock from exiting the handset. Rubber washers are employed on either side of the polyester to help keep moisture out of both the transmitter and receiver cups and also spaced the polyester elements away from the front surfaces of the transmitter and receiver to help maintain the acoustic performance of the telephone handset from introduction of distortion.

BRIEF DESCRIPTION OF THE DRAWINGS

A better understanding of the present invention may be had from consideration of the following detailed description taken in conjunction with the accompanying drawings in which.

DETAILED DESCRIPTION OF THE PREFERRED EMBODIMENT

Figure 1:
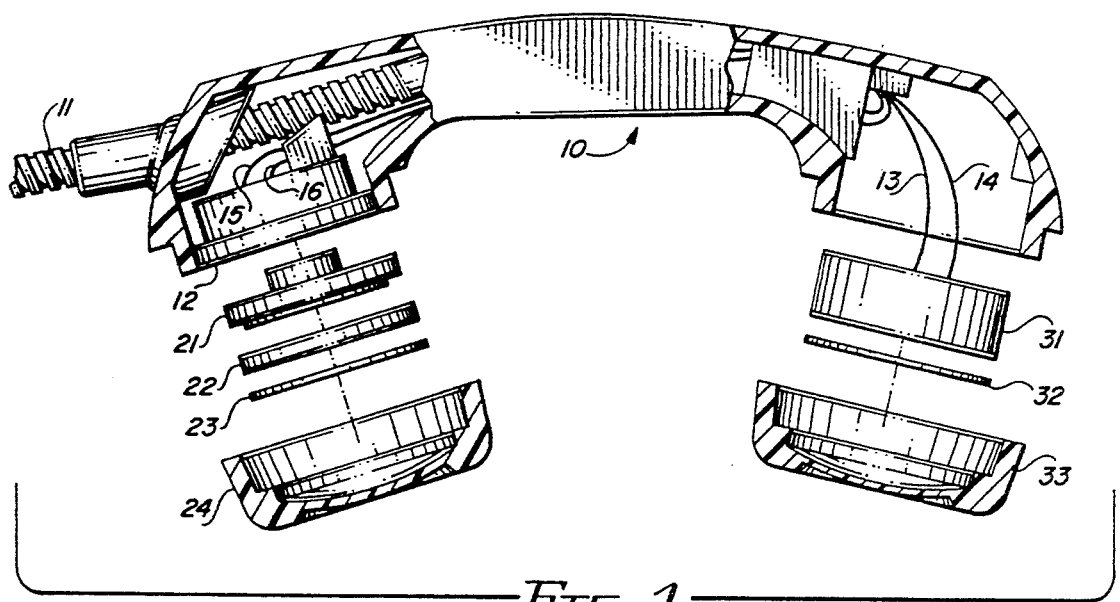
FIG. 1 is an exploded partial sectional view of a telephone handset for use with a paystation in accordance with the present invention.

Referring now to FIG. 1, a telephone handset 10 is shown in sectional form. The handset is connected through a cord covered by armored cable 11 to an associated paystation (not shown). Within the paystation, the four cord conductors 13, 14, 15 and 16 are typically connected to a line interface circuit board.

At one end of the telephone handset 10 is a transmitter cup 12 to which are connected transmitter leads 15 and 16. The transmitter cup provides space to receive and make electrical connection to transmitter 21. After insertion of transmitter 21 into transmitter cup 12, a gasket 22 is applied to the front. Shock preventing element 23 which shall be discussed hereinafter is then applied. After all of the above elements are in place, transmitter cap 24 is fastened to handset 10 to retain the transmitter 21, gasket 22 and shock preventing element 23 securely in place.

At the other end of the handset 10, receiver capsule 31 is inserted into the handset with electrical connections being made to the receiver capsule by wires 13 and 14 included in the cord extending from the paystation. A shock preventing element 32, similar to element 23, is placed in front of receiver 31 after which receiver cap 33 is secured over receiver 31 and shock preventing element 32 to retain them in place within the handset 10.

Figure 2:
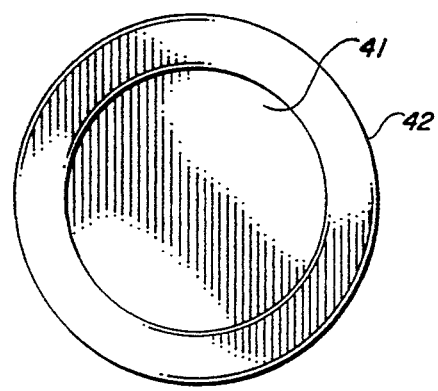
FIG. 2 is a top view of a protective element as used to prevent shock in a telephone handset in accordance with the present invention.
Figure 3:
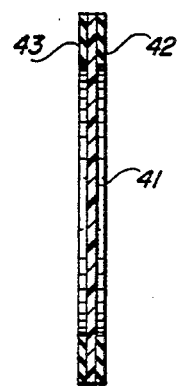
FIG. 3 is a sectional view taken through the protective element shown in FIG. 2 for use in a telephone handset in accordance with the present invention.

The shock inhibiting unit shown in enlarged form in FIGS. 2 and 3 consists of a thin sheet of polyester (Mylar) placed between two rubber or neoprene washers and then placed within the transmitter and receiver sections at both ends of the telephone handset to effectively block the transmission of electrical shock from the handset to the user. The protective element 41 is made of polyester typically between 2 and 4 mils, but preferably of 3 mil construction placed between two neoprene gaskets or washers 42 and 43, each of which is between 0.010" and 0.020", but preferably 0.015" thick. The washers assist in keeping moisture out of the transmitter and receiver cups and also space the polyester element away from the surface of the transmitter and receiver to assist in maintaining proper acoustics.

It can be understood how the handset may be subject to the application of a high potential which may cause shock inasmuch as typically 130 volts DC positive or negative is applied to one of the lines extending to the central office at earth ground depending upon whether it is desired to collect or return any coin deposited in the paystation. Such voltage then comes through the central office through the tip lead (L2) to a line interface network board typically retained within a telephone paystation. Such potential then enters a winding of a transformer included on the line interface board and routed to a coin relay and then through another winding to the common lead of the transmitter and receiver. This high voltage signal then goes through the terminal board located within the telephone paystation to one side of the transmitter and receiver.

It is obvious that such high voltage signals may be coupled from one side of the transmitter and receiver to the other. Such signals may then be coupled either both through and around the transmitter and receiver in the handset and while the coin relay is returning to the normal position, it can generate voltage in excess of 500 volts through what is referred to as inductive kick. It has been determined that when the coin relay generates such high voltages, the signal will backtrack through the transformer on the line interface card and return in a manner similar to that described above over the various leads to the transmitter and receiver with the potential danger of providing electrical shock to the telephone user.

While but a single embodiment of the present invention has been shown, it will be obvious to those skilled in the art that numerous modifications may be made without departing from the spirit of the present invention which shall be limited by the scope of the claims appended hereto.

What is claimed is:

1. A telephone handset for use with an associated telephone paystation comprising:
    a body portion including a first hollow section;
    a transmitter positioned in said first hollow section;
    said body portion further including a second hollow section;
    a receiver positioned in said second hollow section;
    a plurality of electrical circuit connections extending from said transmitter and from said receiver through said associated paystation to a telephone central office;
    first cap means secured to said handset over said transmitter;
    second cap means secured to said handset over said receiver;
    first shock preventing means positioned between said transmitter and said first cap;
    second shock preventing means positioned between said receiver and said second cap;
    said first and second shock preventing means each comprise a sheet of dielectric material and support means;
    said support means comprise first and second annular dielectric gaskets secured to the perimeter of said dielectric material sheet;
    whereby in response to the application of a high voltage DC potential to said electrical circuit connections at said telephone central office, said potential is blocked from being conducted to a user of said handset.

2. A telephone handset as claimed in claim 1 wherein: said dielectric material is constructed of polyester.

3. A telephone handset as claimed in claim 1 wherein: said support gaskets are constructed of neoprene.

4. A telephone handset as claimed in claim 1 wherein: said dielectric material is between 2 and 4 mils thick.

5. A telephone handset as claimed in claim 1 wherein: said neoprene gaskets are constructed of neoprene material between 0.010" and 0.020" thick.

* * * * *